United States Patent [19]
O'Kane et al.

[11] 3,775,090
[45] Nov. 27, 1973

[54] METHOD OF PREPARING LATERITE ORE MIXTURES FOR REDUCTION ROASTING

[75] Inventors: Patrick T. O'Kane; Donald Robert Weir, both of Fort Saskatchewan, Alberta; Vladimir N. Mackiw, Islington, Ontario, all of Canada

[73] Assignee: Sherritt Gordon Mines Limited, Toronto, Ontario, Canada

[22] Filed: Oct. 5, 1970

[21] Appl. No.: 77,982

[52] U.S. Cl. .................................................. 75/1
[51] Int. Cl. .................................................. C21b 1/00
[58] Field of Search ....................... 75/1, 82, 119

[56] References Cited
UNITED STATES PATENTS
| | | | |
|---|---|---|---|
| 2,400,461 | 5/1946 | Hills | 75/82 X |
| 3,202,502 | 8/1965 | Lean et al. | 75/1 |
| 3,244,513 | 4/1966 | Zubryckyj | 75/119 |
| 3,323,900 | 6/1967 | Takahashi et al. | 75/2 |
| 3,582,005 | 6/1971 | Archibald et al. | 75/1 X |
| 3,655,364 | 4/1972 | Evans et al. | 75/82 X |

FOREIGN PATENTS OR APPLICATIONS
| | | | |
|---|---|---|---|
| 1,168,858 | 10/1969 | Great Britain | 75/119 |

*Primary Examiner*—A. B. Curtis
*Attorney*—Frank I. Piper and Arne I. Fors

[57] ABSTRACT

Laterite ore consisting of mixtures of limonite and serpentine of variable iron content is processed to produce a reduction furnace feed of substantially constant iron analysis. The ore mixture is dried and classified by size. The separation is made at a particle size between the range of 65 and 325 mesh. Two fractions, one composed of fine particles having a substantially constant high iron analysis and the other comprises of coarse particles having a substantially constant low iron analysis are obtained. These fractions are dry blended in the proportions required to give a roaster feed having a substantially constant, predetermined iron analysis.

6 Claims, 1 Drawing Figure

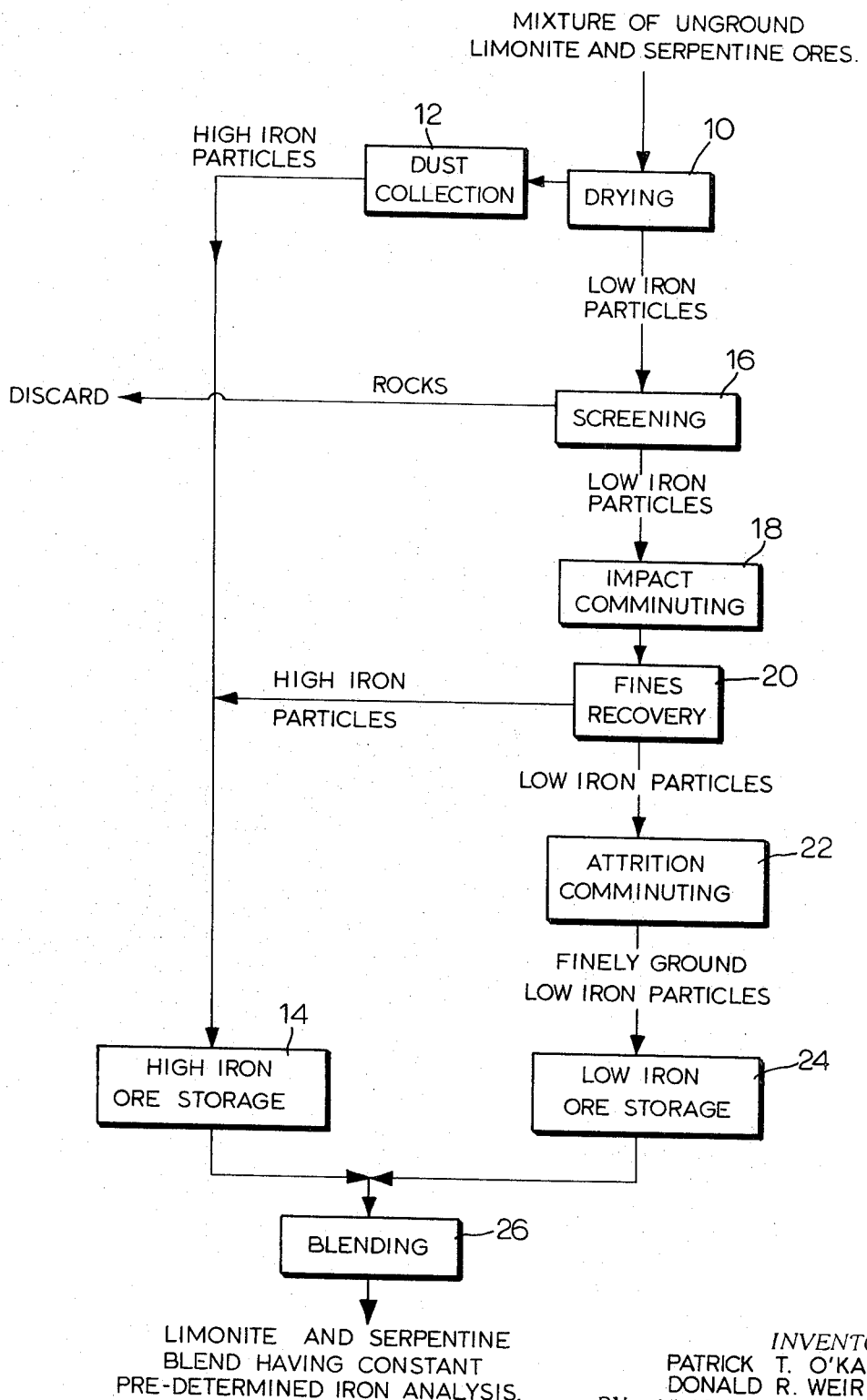

METHOD OF PREPARING LATERITE ORE MIXTURES FOR REDUCTION ROASTING

This invention relates to a method for treating nickeliferous laterite ore mixtures to prepare a reduction roaster feed stream having a substantially constant iron analysis.

"Laterite" is a geological term applied to ferruginous ores produced by weathering of rocks under moist tropical conditions. The ores, which vary widely in composition, occur in deposits near the surface of the earth under a soft overburden of variable depth. Nickeliferous laterites, which are produced from weathering of nickel and iron containing rocks, consist of soft, sometimes clay-like decomposited material and usually are found in layered deposits comprised of minerals termed "limonite" and "serpentine". A typical lateritic nickel ore deposit is found on Nonoc Island in the Philippines. The deposit is made up of three distinct layers. The top layer is limonite from which the nickel and cobalt values have been largely removed by leaching. The metal values in this layer typically range between 0.4 and 0.8 percent by weight nickel, 0.05 and 0.08 percent by weight cobalt and 46 and 48 percent by weight iron. The middle layer is unconsolidated limonite which is relatively rich in nickel and cobalt. Its metal values range between 0.9 and 1.4 percent nickel, 0.09 and 0.13 percent cobalt and 41 and 46 percent iron. The bottom layer is consolidated serpentine; its metal content ranges between 0.8 and 1.7 percent nickel, 0.05 and 0.08 percent cobalt and 11 and 17 percent iron. Thus, the limonite layers contain a relatively large amount of iron, i.e., from 41 to 48 percent and the serpentine layer contains much less iron, i.e., from 11 to 17 percent. The ore in all three layers is usually quite wet; a moisture content of 40 percent is commonplace.

Since laterite deposits are soft and overlain by a soft relatively thin layer of overburden, the deposits can usually be mined by open-pit methods. The mining operation can be accomplished by means of earth moving equipment such as bulldozers, power shovels and drag lines. Drilling and blasting are rarely required. The mined ore generally is transported to stock-piles from whence it is fed to the processing plant.

Various processes are known for recovering nickel and cobalt in concentrated or pure form from ore mixtures comprised of nickeliferous limonite and serpentine. The present invention is concerned with the preparation of such ore mixtures for treatment by those particular processes in which the ore is reduction roasted under closely controlled conditions to convert the nickel and cobalt values to a form in which they can be substantially selectively extracted by leaching under oxidizing conditions with ammoniacal ammonium salt solution.

The iron content of the ore treated in this reduction roasting operation has a very pronounced affect on the responsiveness of the ore to the roasting under any fixed set of roasting conditions. Roasting conditions which produce optimum results when applied to an ore with one iron content will not produce the same results when applied to an ore with a slightly higher or lower iron content. Since it is impracticel to alter roaster conditions to take into account the variations in iron content there normally are in laterite ores, it is very important to control the iron analysis of the feed to the reduction operation within very narrow limits. If this is not done, the nickel and cobalt recoveries vary widely and serious problems are encountered with the operation of the thickeners used in the leaching circuit. Owing to the variations in the ore composition within any given deposit, it is very difficult to control the iron analysis of the feed stream within the desired limits.

Customarily the main control over iron analysis is achieved by selective mining techniques. Draglines are operated at assayed faces in the limonite and serpentine beds; predetermined numbered of truckloads of ore from each face are dumped in a common storage area. A laterite ore mixture having fairly constant iron analysis is thereby provided as feed for the roasting operation. This mixture cannot be used as roaster feed without further treatment since it still contains slugs of predominantly high or low iron which cannot be permitted to enter the roaster. As practiced in the prior art, these large variations in the iron analysis of the mixture are lowered by repeatedly "bedding" the ores in the storage area. In this way, the various ores are mixed and a substantially homogenized feed stock having an iron analysis variation of only 2 to 3 percent is obtained.

Bedding of the ore is a costly operation and moreover variations as much as 2 – 3 percent in the iron analysis of the roaster feed still cause serious problems. The nickel and cobalt extractions from the ore vary considerably and the thickeners do not operate satisfactorily. It is highly desirable for optimum nickel and cobalt recoveries and efficient operation of the leach circuit to control the iron analysis of the feed ore within limits narrower than 2–3 percent.

It is therefore an object of the present invention to process nickeliferous laterite ore mixtures to produce a feed stock for reduction roasting which has a substantially constant, predetermined iron analysis.

It is another object to carry out this process without using any special equipment which is not already required in the procedures described above for recovering nickel and cobalt from the ore mixtures.

The invention is based on the discovery that there is surprisingly good correlation between the iron analysis of unground laterite ore particles and their size. The term "unground" as used herein refers to the stage of sub-division of the ore after it has been subjected to a crushing operation to break up large lumps but before the ore reaches the ball-mill for grinding to prepare it for reduction roasting and leaching. The unground particles having a high iron analysis, both of limonite and serpentine are relatively fine. The particles of both minerals having a low iron analysis are relatively coarse. Although the average iron analysis of the serpentine ore is relatively low, fine particles in the ore have a relatively high iron content in comparison to the coarser particles. Similarly, coarse particles in limonite have a relatively low iron analysis despite the fact that the average iron content of the limonite is high.

The invention comprises drying and dividing the particles of unground laterite ore into particles larger than a given size and having a low iron analysis and particles smaller than the given size and having a high iron analysis. When this is done, it is found that either fraction has a substantially constant iron analysis by weight. The variation is less than 2 percent by weight and is usually less than 1 percent by weight. The fractions are dry blended in the proportions required to provide a stream of roaster feed having a closely controlled, predetermined iron analysis for which optimum roaster conditions can be established and maintained.

More specifically, the process in accordance with the invention involves treating a moist mixture of limonite and serpentine ores to provide a stream of roaster feed having a substantially constant iron analysis by weight including the steps of: drying the ore mixture; dividing the dried ore particles into two fractions, one fraction consisting of particles larger than a predetermined size and predominantly consisting of low iron particles and a second fraction consisting of particles no larger than the predetermined size and predominantly consisting of high iron particles; and continuously combining the two fractions in proportions necessary to achieve a blend having a predetermined substantially constant iron analysis by weight.

It is found that, in general, the majority of laterite ore particles larger than 65 mesh (U.S.A. standard) have a relatively low iron analysis and particles smaller than 325 mesh have a relatively high iron analysis. For purposes of the present disclosure, ore which has iron analysis of about 40 percent is arbitrarily referred to as having a "high" iron analysis and ore having an analysis below 40 percent is said to have a "low" iron analysis. Accordingly, the dividing line between the two size fractions should occur in the range between 65 mesh and 325 mesh. Preferably, the separation is made at a particle size of about 200 mesh. If a split is made at a particle size larger than 65 mesh, too much serpentine reports to the fine fraction with a consequent lowering of the iron analysis of that fraction. If the split is made at a particle size smaller than 325 mesh, too much limonite reports to the low iron fraction. It is important that the two fractions be significantly different in iron analysis in order to permit closer control of the iron content of the blended fractions. This is achieved when the split is made within the range 65 mesh and 325 mesh.

The process of the invention is more fully described with reference to the drawing which is a simplified flow sheet showing the operational sequences in the preferred embodiment of the present invention.

In accordance with the preferred procedure, the moist ore is first dried in an oil-fired rotary drying kiln 10. Hot gases are passed through the drier at a high velocity so that a large proportion of the high iron particles will be picked up and exit from the drier in the gas stream. Thus, the operating conditions of the drier are not adjusted to minimize dust losses as is the conventional procedure. Rather, the conditions are controlled to achieve high dust losses. Preferably the velocity of the hot gases is in the range of 7 to 20 feet per second. When the drier operates under these conditions, it serves not only to dry the ore but to classify it roughly into minus 200 mesh particles (which exit with the gases) and plus 200 mesh particles. The particles which exit with the hot gases predominantly consist of particles having a high iron analysis. The plus 200 mesh particles remaining in the drier have a predominantly low iron analysis by weight.

The fine fraction entrained in the exit gases is collected in dust collection apparatus 12 such as a cyclone system and electrostatic precipitator. The dust passes to high iron storage stockpile 14.

The coarse fraction from the drier passes to screen 16 where large rocks such as plus 2 mesh are separated. The rocks generally do not contain nickel and cobalt in economically sufficient quantities to justify treatment for their extraction. Accordingly, the rocks are discarded. The material passing through the screen passes to impact comminuting apparatus 18 such as a hammer-mill, in which fines adhering to coarse particles are separated therefrom and agglomerated fines are broken down. The fines are removed in fines recovery apparatus 20 such as an air classifier and added to the high iron fraction from the drier in stockpile 14. The coarse fraction passes from apparatus 18 to attrition grinding apparatus 22 to reduce the particle size. Apparatus 22 may be in the form of a ball-mill. Ground material from apparatus 22 passes to low iron stockpile 24.

Material is drawn from the two stockpiles and blended proportionally at 26 to produce a feed stock having a predetermined and constant iron content.

The method of the invention therefore in its simplest form involves two steps: first dividing the dried mixture of serpentine and limonite ores into two fractions, one fraction consisting of particles larger than a predetermined size and having a relatively low iron analysis and the other fraction consisting of particles smaller than the predetermined size and having a relatively low iron analysis and the other fraction consisting of particles smaller than the predetermined size and having a relatively high iron analysis and secondly blending portions of these two fractions together to obtain a roaster feed having a predetermined iron analysis. Those skilled in the art will appreciate that detailed flow schemes other than that shown in the drawing can be devised which accomplishes the steps of the invention. The scope of the invention is intended to cover equivalent procedures.

The procedure described has two important advantages. As mentioned, the variation in iron content can be reduced to less than 1 percent. The operation of the roaster and circuit thickeners is greatly improved as a result. Also, the procedure is helpful when coping with drastic changes in composition of the ore being mined. According to prior art practices, if the composition of the ore changes, there is no way to gradually adapt the roaster and the remainder of the circuit to these changes. By providing two stockpiles and dry blending to provide feed, as is done in the present case, sudden changes in ore composition from the mine can be accommodated by providing a gradual change in the composition of the blended feed and gradually adjusting the furnace conditions to the new feed composition.

EXAMPLE 1

This example illustrates the relationship between particle size and iron analysis of unground limonite and serpentine ores. A simple method which depends on this relationship is described for providing a roaster feed of a predetermined iron analysis.

The ores originated from a nickeliferous laterite deposit located in the Philippines. Samples of limonite and serpentine were screened and analyzed with the following results:

TABLE I

Size distribution of limonite — wet screened, unground:

| Size Fraction | | % by weight of total | Analysis % by weight | | |
|---|---|---|---|---|---|
| | | | Ni | Co | Fe |
| | +12 inch | 2.5 | 0.43 | 0.013 | 5.97 |
| −12 | +6 inch | 1.9 | 0.43 | 0.013 | 5.97 |

| | | | | | |
|---|---|---|---|---|---|
| −6 | +2 inch | 1.9 | 0.71 | 0.013 | 6.23 |
| −2 | +1 inch | 0.4 | 0.80 | 0.013 | 6.59 |
| −1 | +0.5 inch | 0.51 | 2.05 | 0.015 | 7.88 |
| −0.5 | +0.2 inch | 0.30 | 1.14 | 0.016 | 6.81 |
| −0.2 | +8 mesh | 0.69 | 1.07 | 0.016 | 6.51 |
| −8 | +14 mesh | 0.79 | 1.09 | 0.084 | 12.1 |
| −14 | +28 mesh | 1.07 | 0.97 | 0.285 | 21.0 |
| −28 | +35 mesh | 0.84 | 0.90 | 0.412 | 25.6 |
| −40 | +65 mesh | 1.98 | 1.17 | 0.574 | 26.4 |
| −100 | +200 mesh | 1.29 | 1.91 | 0.894 | 28.0 |
| −200 | +325 mesh | 0.38 | 1.50 | 0.650 | 29.4 |
| −325 | +400 mesh | 5.99 | 1.61 | 0.554 | 38.1 |
| −400 | mesh | 78.4 | 1.44 | 0.108 | 46.6 |

TABLE II

Size distribution of serpentine — wet screened, unground

| Size Fraction | | % by weight of total | Analysis % by weight | | |
|---|---|---|---|---|---|
| | | | Ni | Co | Fe |
| | +12 inch | 12.4 | 0.80 | 0.013 | 5.92 |
| −12 | +6 inch | 14.0 | 1.18 | 0.104 | 6.50 |
| −6 | 30 2 inch | 9.1 | 1.25 | 0.016 | 7.19 |
| −2 | +1 inch | 4.8 | 1.33 | 0.092 | 9.47 |
| −1 | +4 mesh | 4.3 | 1.24 | 0.013 | 6.97 |
| −4 | +8 mesh | 4.1 | 1.10 | 0.013 | 6.49 |
| −8 | +14 mesh | 4.7 | 1.20 | 0.017 | 6.92 |
| −14 | +28 mesh | 4.6 | 1.14 | 0.031 | 8.55 |
| −28 | +35 mesh | 2.1 | 1.14 | 0.064 | 9.13 |
| −35 | +65 mesh | 3.5 | 1.23 | 0.104 | 9.80 |
| −65 | +100 mesh | 1.5 | 1.43 | 1.150 | 10.7 |
| −100 | +200 mesh | 1.7 | 1.46 | 0.182 | 12.2 |
| −200 | +325 mesh | 3.0 | 1.51 | 0.178 | 16.4 |
| −325 | +400 mesh | 0.7 | 1.51 | 0.166 | 20.6 |
| −400 | mesh | 29.5 | 1.73 | 0.058 | 30.6 |

Approximately 70 parts limonite were blended with approximately 30 parts serpentine and the blended material, containing 42 percent by weight water, was fed at a maximum rate of 5,400 pounds per hour into a 4 foot diameter by 35 foot long rotary drier. The drier was fired with Bunker "C" fuel. Combustion gas and air at 70°F. passed through the drier at a velocity of 4 feet per second. The exit temperature of the gas was 245°F. The ore was resident within the drier for 55 minutes. The dust in the gas was recovered using a cyclone separator and a bag-type filter.

The fine product collected from the drier exit gas comprised approximately 18 percent by weight of the total product. It was found that 99 percent of the fraction would pass through a 325 mesh per inch screen. The material analyzed as follows: Ni - 1.31 percent by weight, Fe - 43.5 percent by weight. The coarse product collected from the drier comprised approximately 82 percent by weight of the total product. It was found that the particles were distributed in accordance with Table III hereinbelow:

TABLE III

| Particle Size | | % of Total Feed |
|---|---|---|
| | +1 inch | 5.0 |
| −1 | +½ inch | 1.9 |
| −½ | +¼ inch | 4.2 |
| −4 | +8 mesh | 7.21 |
| −8 | +10 mesh | 8.8 |
| −10 | +20 mesh | 18.3 |
| −20 | +32 mesh | 13.54 |
| −32 | +65 mesh | 10.8 |
| −65 | +100 mesh | 5.4 |
| −100 | +150 mesh | 5.4 |
| −150 | +200 mesh | 0.8 |
| −200 | +325 mesh | 0.4 |
| −325 | mesh | 0.6 |
| | | 82.35 |

The material analyzed as follows: Ni - 1.33% by weight, Fe - 31.9 percent by weight.

Tables I and II show the correlation between particle size and iron analysis of unground limonite ore and unground serpentine ore. The iron analysis of both ores increases with decreasing particle size. The average particle of limonite is however, somewhat richer than the particle of serpentine of the same size.

The relation between particle size and iron analysis is reflected in the product from the drier. The drier serves the dual purpose of drying and classifying the ore into −325 and +325 mesh particles. The average iron analysis by weight of the −325 mesh particle is 42.5 percent and the +325 mesh particles is 31.9 percent.

To prepare a roaster feed having an average iron analysis between 31.9 and 42.5 percent, it is merely necessary to treat the ore in a drier to dry and classify the mixture into +325 and −325 mesh fractions and combine the two fractions in the correct proportions. For example, should a roaster feed analyzing 35 percent iron be required, the proportion by weight of −325 mesh particles to +325 mesh particles is calculated as follows:

$$42.5x + 31.9y = 35z$$

$$x + y = z$$

where $x$ is weight of −325 mesh particles $y$ is weight of +325 mesh particles $z$ is total weight of particles analyzing 35 percent Fe.

$$42.5x + 31.9y = 35(x + y)$$

$$(42.5 − 35)x = (35 − 31.9)y$$

$$x/y = (42.5 − 35)/(35 − 31.9) = 7.5/3.1 = 2.4$$

Therefore, the −325 mesh particles must be blended with the +325 mesh particles in the ratio of 1 to 2.4.

What we claim as new and desire to protect by Letters Patent of the United States is:

1. The method of treating moist, unground nickeliferous limonite and serpentine ore particles to provide a stream of roaster feed having a substantially unchanging predetermined iron analysis by weight which comprises: providing a mixture of said limonite and serpentine particles in varying proportions, said particles ranging in size from greater than 65 mesh to less than 325 mesh; drying the ore mixture; continuously dividing the dried ore mixture into first and second fractions, said first fraction consisting of particles larger than a predetermined size within the range of 65 and 325 mesh and predominantly consisting of particles containing less than about 31.9 percent by weight iron and said second fraction consisting of particles no larger than the predetermined size and predominantly consisting of particles containing more than about 40 percent by weight iron and continuously combining the two fractions in the same proportions to achieve a blend having a substantially unchanging predetermined iron analysis.

2. The method as set forth in claim 1 wherein the predetermined size of the particles is about 200 mesh.

3. The method as set forth in claim 1 wherein a stream of hot gas is passed by said unground ore mixture to dry said mixture, said gases travelling at a high velocity so that a substantial portion of the particles in said second fraction is picked up in said gas stream and separates from the remaining particles in said mixture.

4. The method as set forth in claim 1 wherein a stream of hot gases is passed by said unground ore mixture to dry said mixture, said gases travelling at a velocity between 7 and 20 feet per second so that a substantial portion of the particles in said second fraction is picked up in said gas stream and separated from the remaining particles in said mixture.

5. The method as set forth in claim 1 further including impact comminuting the mixture in order to break up agglomerated particles thence dividing the dry ore into said two fractions.

6. The method as set forth in claim 1 including the following step: impact comminuting the particles in the first fraction to break up agglomerated particles; separating any broken down particles smaller than the predetermined size and combining said particles with said second fraction and attrition grinding the remaining particles in the first fraction.

* * * * *